E. V. PETERSON.
FENDER.
APPLICATION FILED JULY 3, 1915.

1,159,263.

Patented Nov. 2, 1915.
2 SHEETS—SHEET 1.

Witnesses
E. C. Arduser Jr.
P. M. Smith.

Inventor
E. V. Peterson,
By Victor J. Evans
Attorney

E. V. PETERSON.
FENDER.
APPLICATION FILED JULY 3, 1915.

1,159,263.

Patented Nov. 2, 1915.
2 SHEETS—SHEET 2.

Witnesses

Inventor
E. V. Peterson,
By Victor J. Evans
Attorney

UNITED STATES PATENT OFFICE.

ELMER V. PETERSON, OF ST. PAUL, MINNESOTA.

FENDER.

1,159,263.           Specification of Letters Patent.    Patented Nov. 2, 1915.

Application filed July 3, 1915. Serial No. 37,862.

*To all whom it may concern:*

Be it known that I, ELMER V. PETERSON, a citizen of the United States, residing at St. Paul, in the county of Ramsey and State of Minnesota, have invented new and useful Improvements in Fenders, of which the following is a specification.

This invention relates to fenders, being especially designed for use upon motor cars, the object in view being to produce a fender the greater portion of which is housed when not in use, combined with means for quickly extending the fender sections and thereby greatly increasing the protective area of the fender as a whole, preventing persons and objects from being struck by the frame, wheels, body and other parts of the machine.

With the above and other objects in view, the invention consists in the novel construction, combination and arrangement of parts, as herein described, illustrated and claimed.

In the accompanying drawings:—

Figure 1:
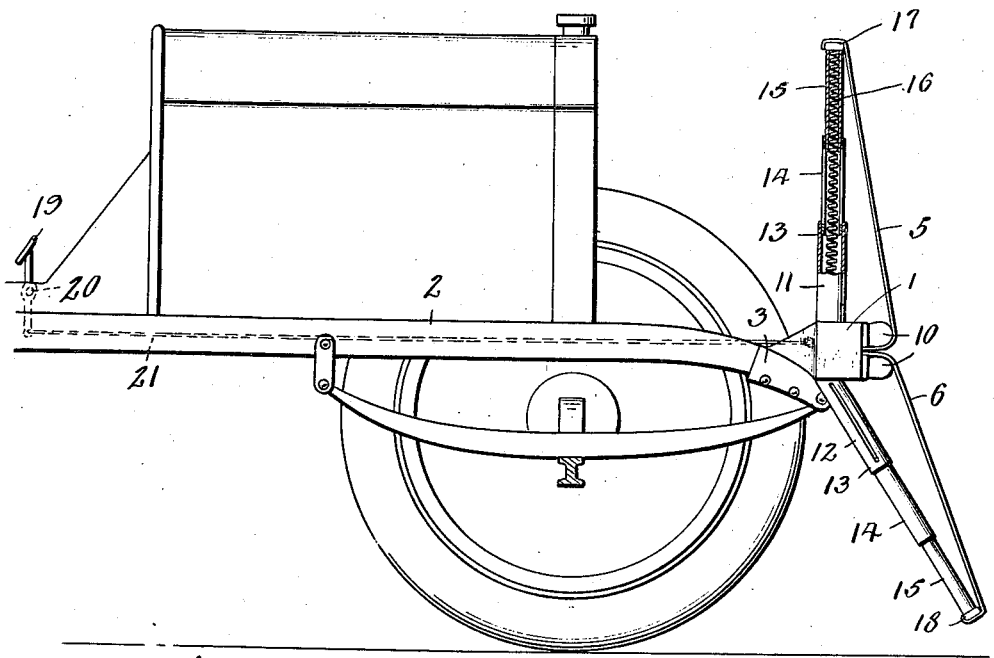
Figure 3:
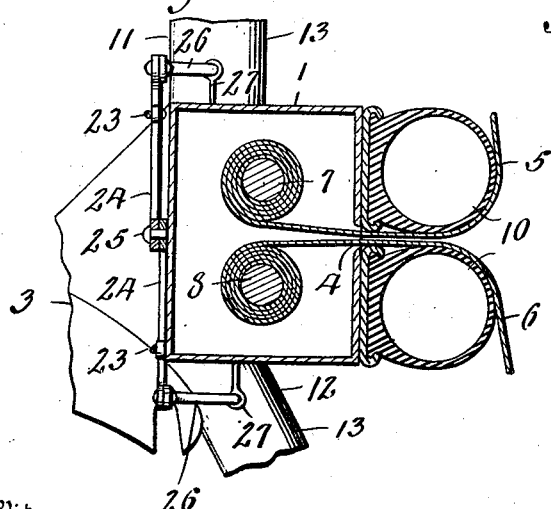
Figure 4:
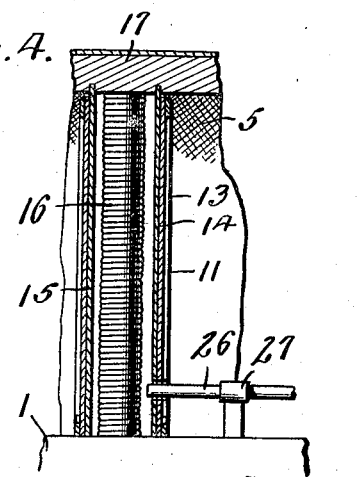
Figure 2:
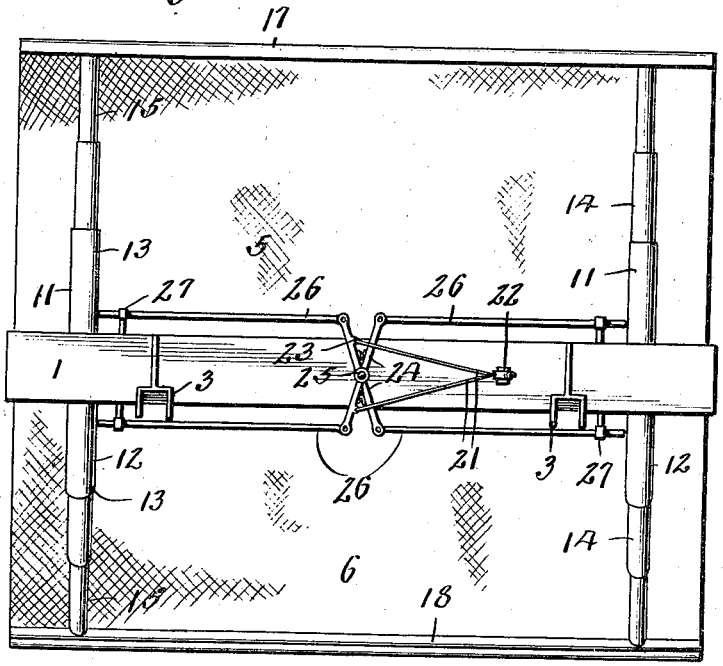
Figure 5:
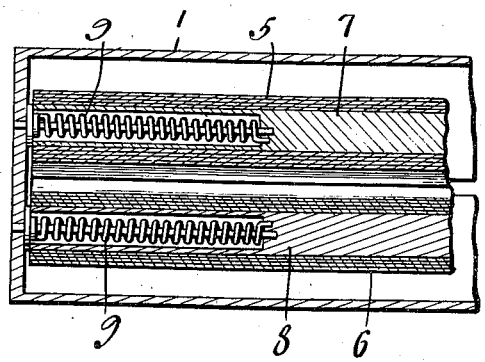

Figure 1 is a side elevation partly in section of a fender embodying the present invention, showing the position assumed by the parts when the fender is in its operative position. Fig. 2 is a rear elevation of the fender. Fig. 3 is an enlarged vertical cross section through the fender housing and the parts intimately associated therewith. Fig. 4 is a fragmentary section through one of the telescopic arms showing the spring therein and the arm contracted. Fig. 5 is a fragmentary vertical section through the apron rollers, aprons and the housing therefor.

The fender contemplated in this invention comprises essentially a horizontally elongated housing 1 which is supported by the frame 2 of an automobile, the casing 1 being provided with supporting legs the arms 3 of which are shown as bolted or otherwise fastened to the side bars of the frame or chassis of the machine.

The housing 1 is provided in the front side thereof with a longitudinally extending slot 4 to admit of the passage therethrough of a pair of flexible aprons 5 and 6 of canvas or any suitable material, the said aprons having their inner end portions attached to a pair of parallel rollers 7 and 8 arranged in spaced relation to each other and journaled in the housing 1. The inner edges of the aprons 5 and 6 are fastened to the rollers 7 and 8 which are of the spring wound type, the said rollers containing the apron rewinding springs 9.

On the front side of the housing 1 and arranged at opposite sides of the slot 2 and parallel therewith are impact cushions 10 which may consist of rubber or other resilient material, the same being shown as of hollow formation in order that they may be inflated if so desired.

In connection with the flexible aprons 5 and 6, apron stretching means are employed, the same being shown as consisting of upwardly and downwardly extensible arms 11 and 12 forming apron stretching members. Two of such members are employed for the upper apron and a similar number for the lower apron. Each arm 11 or 12 is of telescopic construction as clearly illustrated in the drawings, the inner sections 13 of the telescopic arms being rigidly fastened to and extending upwardly and downwardly from the housing 1 while the other members 14 and 15 are adapted to telescope one within the other and both within the respective section 13. Coiled expansion springs 16 are arranged within the telescopic sections of the arms 11 and 12, all of the sections being tubular so as to contain, conceal and protect the springs 16. The aprons 5 and 6 are attached to end cross bars 17 and 18 carried by the terminal sections 15 of the stretching members, the said aprons therefore serving to limit the extension of the apron stretching members. The length of the lower apron 6 is preferably designed to prevent the bottom portion of the fender from coming into contact with the ground or road surface. The springs 16 are stronger than the springs 9 of the rollers 7 so as to permit the springs 16 to effect the stretching of the fender aprons. The springs 9 assist in returning the members of the fender to their inoperative or housed positions.

The means for latching and unlatching the apron stretching members comprises, in the preferred embodiment of the invention, a pedal lever 19 fulcrumed at 20 adjacent to the dash of the machine and having attached thereto one or more flexible cables 21 which extend forwardly to the fender where they are shown as passing around one or more guide pulleys 22, being finally attached at 23 to a pair of latch operating levers 24 centrally crossed and pivotally mounted at 25 on the housing 1. Latches 26 extend from the extremities of the levers through guides 27, the outer extremities of the latches 26 engaging notches or sockets in the apron stretching members when the same are collapsed or contracted.

From the foregoing description, taken in connection with the accompanying drawings, the operation of the fender will now be understood. Under normal conditions, the aprons 5 and 6 are wound upon the rollers 7 and 8 and the apron stretching members 11 and 12 are contracted so that very little room is occupied by the fender when not in use, the parts being held in such position by the latches 26. At any moment desired, the operator by pressing on the pedal 19 may simultaneously withdraw all of the latches 26 out of engagement with the apron stretching members, thereby releasing said members and allowing the same to stretch the aprons 5 and 6 respectively in an upward and downward direction greatly increasing the protective area of the fender which is amply cushioned by reason of the construction described to prevent injury to a person struck by the fender.

The fender extends nearly to the ground so as to prevent persons from getting under the wheels and body of the car and also extends to a sufficient height to prevent a person from coming into contact with the radiator, fenders and frame of the machine.

What I claim is:—

1. The combination with the frame of an automobile, of a horizontally elongated and slotted housing fastened thereto and projecting at its ends in front of the wheels of the machine, parallel rollers journaled in said housing in spaced relation to each other, flexible fender aprons wound upon said rollers and having their free end portions passed through the slot in said housing, compressible apron stretching members acting when released to thrust one apron upwardly and the other downwardly, and means for latching and unlatching the apron stretching members.

2. The combination with the frame of an automobile, of a horizontally elongated and slotted housing fastened thereto and projecting at its ends in front of the wheels of the machine, parallel spring wound rollers journaled in said housing in spaced relation to each other, flexible fender aprons wound upon said rollers and having their free end portions passed through the slot in said housing, compressible apron stretching members acting when released to thrust one apron upwardly and the other downwardly, and means for latching and unlatching the apron stretching members.

3. The combination with the frame of an automobile, of a horizontally elongated and slotted housing fastened thereto and projecting at its ends in front of the wheels of the machine, parallel rollers journaled in said housing in spaced relation to each other, flexible fender aprons wound upon said rollers and having their free end portions passed through the slot in said housing, compressible spring extended apron stretching members acting when released to thrust one apron upwardly and the other downwardly, and means for latching and unlatching the apron stretching members.

4. The combination with the frame of an automobile, of a horizontally elongated and slotted housing fastened thereto and projecting at its ends in front of the wheels of the machine, parallel rollers journaled in said housing in spaced relation to each other, flexible fender aprons wound upon said rollers and having their free end portions passed through the slot in said housing, cushions carried by said housing at opposite sides of the slot therein, compressible apron stretching members acting when released to thrust one apron upwardly and the other downwardly, and means for latching and unlatching the apron stretching members.

5. The combination with the frame of an automobile, of a horizontally elongated and slotted housing fastened thereto and projecting at its ends in front of the wheels of the machine, parallel rollers journaled in said housing in spaced relation to each other, flexible fender aprons wound upon said rollers and having their free end portions passed through the slot in said housing, compressible apron stretching members acting when released to thrust one apron upwardly and the other downwardly, and means for latching and unlatching the apron stretching members, the aprons acting as means for limiting the extension of the apron stretching members.

6. The combination with the frame of an automobile, of a horizontally elongated and slotted housing fastened thereto and projecting at its ends in front of the wheels of the machine, parallel rollers journaled in said housing in spaced relation to each other, flexible fender aprons wound upon said rollers and having their free end portions passed through the slot in said housing, compressible apron stretching members embodying spring extended telescopic arms acting when released to thrust one apron upwardly and the other downwardly, and means for latching and unlatching the apron stretching members.

In testimony whereof I affix my signature in presence of two witnesses.

ELMER V. PETERSON.

Witnesses:
  F. J. GEHAN,
  EDWIN IRLE.